Oct. 30, 1956  C. W. LINCOLN ET AL  2,768,531
POWER STEERING APPARATUS
Filed May 21, 1954  2 Sheets-Sheet 2

INVENTORS
Clovis W. Lincoln &
BY Philip B. Zeigler
C. H. Dibble
ATTORNEY

United States Patent Office 2,768,531
Patented Oct. 30, 1956

2,768,531

POWER STEERING APPARATUS

Clovis W. Lincoln and Philip B. Zeigler, Saginaw, Mich., assignors to General Motors Corporation, Detroit, Mich., a corporation of Delaware Application May 21, 1954, Serial No. 431,482

6 Claims. (Cl. 74—388)

This invention relates to power steering and more particularly concerns a fluid pressure-operated power steering system especially adapted for application to tractors of the type including a steering linkage comprising a pair of drag links, each actuated through a separate Pitman arm.

In the case of farm tractors and other vehicles used off-the-road, it is manifestly highly desirable that any auxiliary equipment, such as a power steering apparatus, applied thereto, be so installed as not to be subject to damage through contact with obstructions, as stumps, for instance, over which the vehicle may be caused to travel. Thus, the ideal power steering gear for such installations would involve no parts disposed below the level of the steering linkage or axles.

Our invention has as its principal object to provide such a power steering gear.

Another object is to provide power steering apparatus which may be effectively integrated with steering parts conventionally used in the steering of tractors of the above indicated type.

Still other objects and features of the invention will be apparent from the following specific description illustrating a preferred embodiment thereof. The description will proceed with reference to the accompanying drawings in which.

Figure 1:
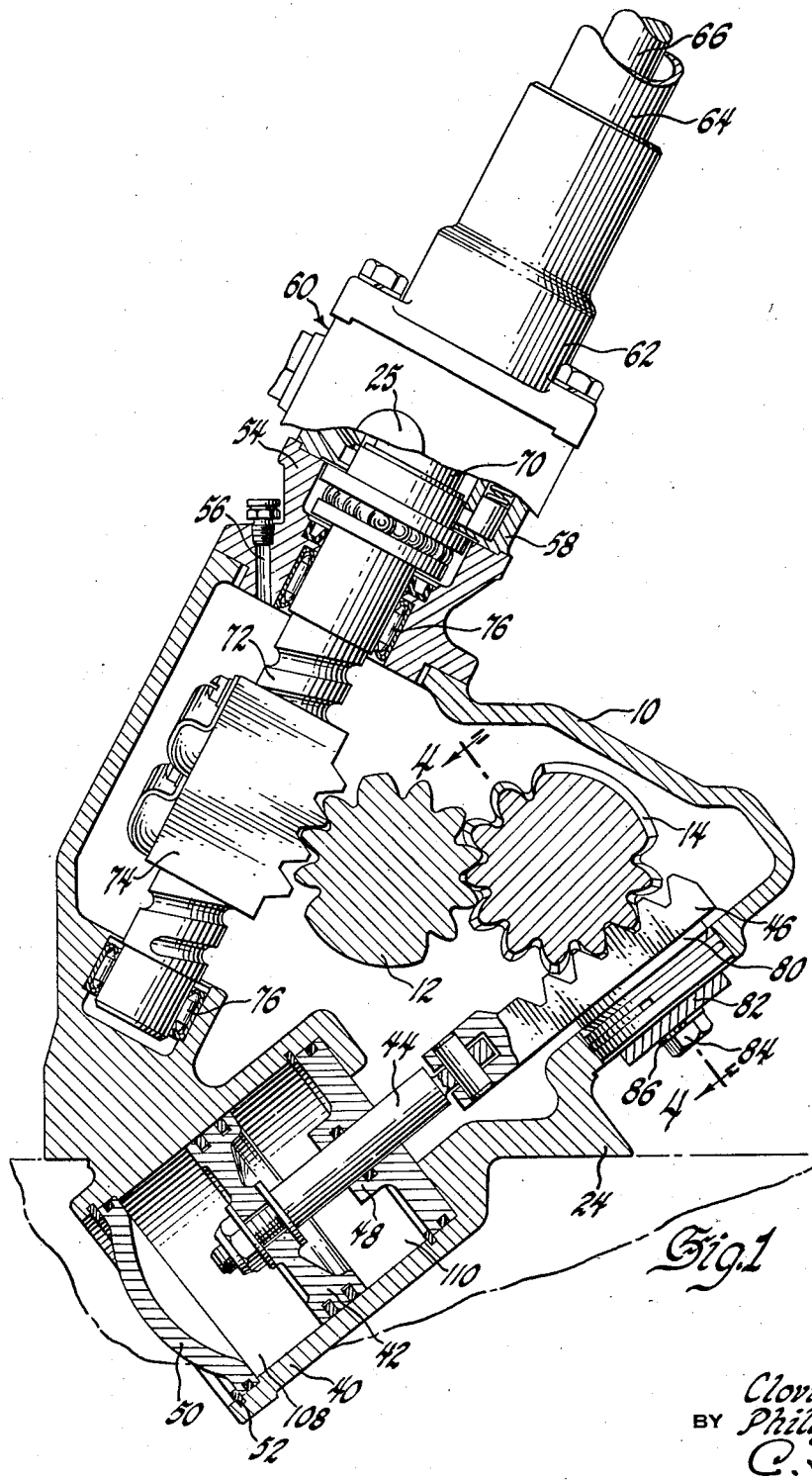
Figure 1 shows the principal parts of the particular gear as normally assembled, certain of the parts appearing in section, others in side elevation.

In the drawings the numeral 10 denotes a casing or gear box confining a pair of pinions 12 and 14, these being fixed to or integral with cross shafts 16 and 18, respectively, extending at opposite sides of the gear box for connection with Pitman arms 20 and 22. The latter are adapted for connection at their lower ends to separate drag links not shown.

Casing 10 includes an integral flange portion 24 facilitating connection of the casing to the frame of the vehicle. A stabilizing bracket 25 shown fastened to the casing at its upper end is also adapted for connection to the vehicle framing.

Extending at the sides of casing 10 are boss portions 26 within which are disposed bushings for the shafts 16, 18. One of these bushings will be seen at 28 in Figure 4. Seal 30 serves to prevent loss of the lubricating fluid normally contained within the casing.

Figure 4:
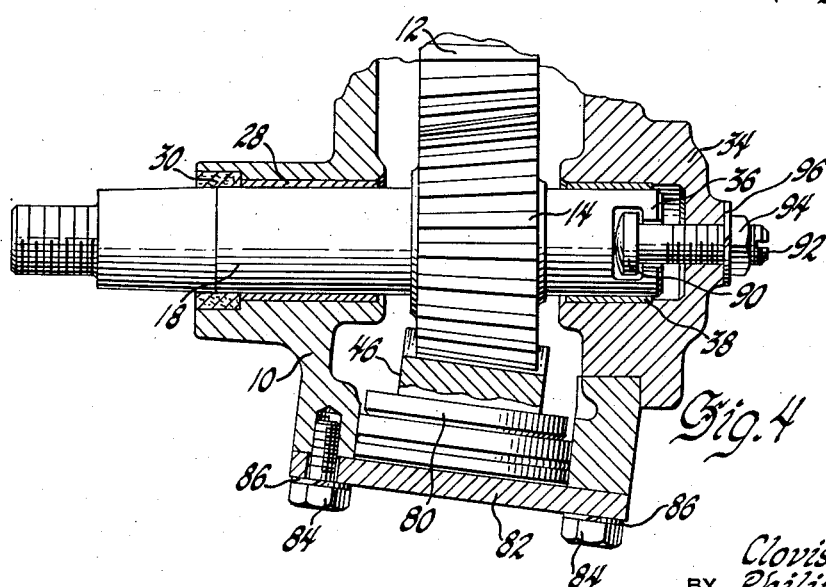
Figure 4 is a detail, partly in section, taken on the line 4—4 in Figure 1.

A pair of plates 32 and 34 bolted at opposite sides of the casing 10 (Figures 2 and 4) each house a bushing in which the stub portion of one of the cross shafts 16, 18 turns—see Figure 4, wherein 36 denotes the stub portion of the cross shaft 18 and 38 the corresponding bushing.

Casing 10 is formed at its lower end to provide a power cylinder 40 within which a piston 42 is adapted to reciprocate, the piston through its shaft 44 being pinned to a rack 46 meshing with the pinion 14. An adaptor plate 48 shouldered into the casing 10 furnishes a bearing for the shaft 44. The opposite end of the cylinder is closed by a dish-shaped plate 50, held in place by a lock ring 52.

Bolted to the top of the casing 10 is a cover 54 vented at 56, which seats the housing portion 58 of a control valve generally indicated by the numeral 60. Upwardly of such housing is a cap piece 62 supporting the tubular column 64, confining the steering shaft 66. Cap piece 62 is internally formed adjacent the housing 58 so as to house valve parts representing the exact complement of those encased within the cover 54.

Valve 60, being old in the art, need not be described in any detail here. Suffice it to say that the valve is of the so-called Davis type (see U. S. Patent 2,213,271) and is actuated by the axial movement of the steering shaft 66, to which the spool portion of the valve, indicated at 70, is made fast.

Steering shaft 66 is formed as a worm 72 at its lower end within the gear box 10. A ball nut 74 is caused to move up or down on the worm depending on the direction the shaft 66 is rotated. Needle bearings 76 permit the axial movement of the steering shaft, necessary for actuation of the valve and energization of the fluid motor represented by the cylinder 40 and piston 42.

Rack 46 is maintained in proper engagement with the pinion 14 by means of a bearing block 80, backed by a plate 82 secured by bolts 84 threaded into the casing 10. Loosening of the bolts 84 is prevented by lock rings, one of which is shown in Figure 1 at 86.

Reverting to the pinions 12 and 14, it should be noted that the teeth thereof are not formed on a side of a segment of a cylinder but rather on a side of a segment of a cone. From Figure 4, it will be seen that the relation of the teeth as between the pinions 12 and 14 and as between the latter pinion and the rack 46 is such that the shaft 18 tends normally to thrust to the right against the button 90, accommodated in a recess formed in the end of the stub portion of the shaft. Obviously, to take up lash by moving shaft 18, it is only necessary to thread the shank 92 farther into the plate 34. Stop button 90 is held in selected position by a nut 94, loosening of which is prevented by a lock ring 96.

Pinion 12, as the same appears in Figure 4, tends normally to thrust to the left rather than the right. Accordingly, the nut through which the corresponding stop button is held in adjusted position, is disposed at the opposite side of the casing 10, the same being denoted by the numeral 98 in Figure 2.

Figure 2:
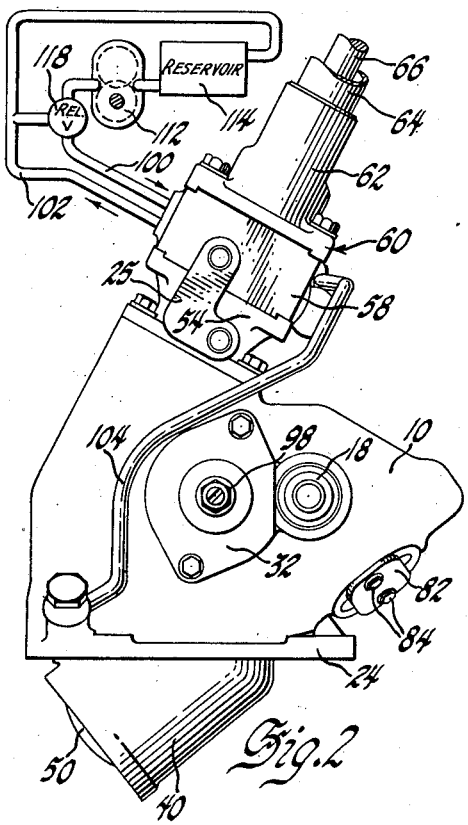
Figure 2 shows the assembly of Figure 1 in side elevation.
Figure 3:
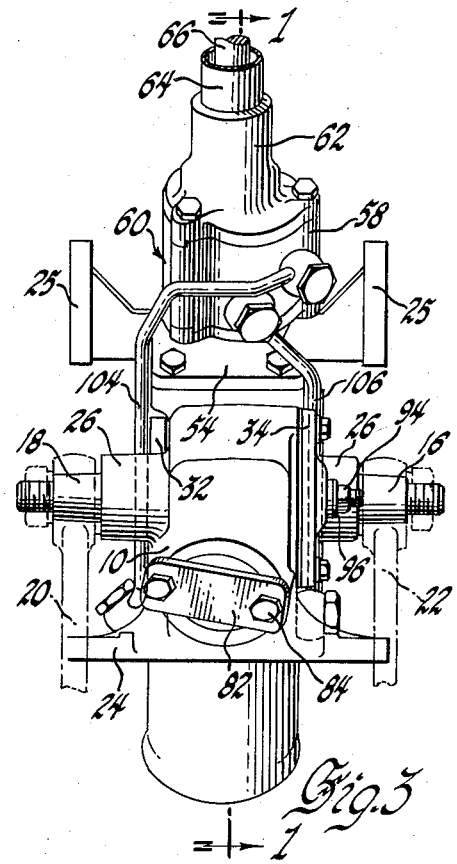
Figure 3 is a view showing the underside of the assembly.

Before proceeding with a description of the operation of the described gear, reference should be made to the conduits 100 and 102 in Figure 2 and to the conduits 104 and 106 seen in Figure 3. The first mentioned conduits extend respectively, to a hydraulic pump 112 and a reservoir 114 from which the pump draws, while conduits 104 and 106 extend, respectively, to the lower chamber 108 and the upper chamber 110 of the fluid motor (Figure 1). Diagrammatic illustration of the pump and reservoir is considered sufficient, considering that these parts are conventional and well known in the art. Normally, the pump is powered from the engine of the vehicle, being ordinarily belted to the crankshaft. A relief valve 118 operates to by-pass fluid back to the reservoir should the pressure in the system become excessive.

Operation

Valve 60 is of the open-center spool type, so that when the parts thereof are in neutral position, with the engine of the vehicle running, the fluid from the pump is continuously circulated through the valve against the static pressure of the fluid in the fluid motor and back to the pump via the reservoir. Assuming a right turn and further assuming a steering resistance exceeding the force of any centering means, such as springs, which may be incorporated in the valve, the steering shaft 66, and with it the moving component 70 of the valve, will be caused by reactionary thrust to move axially downward with the result that a pressure differential is created in the fluid motor in favor of the lower chamber 108. Piston 42 is consequently forced upwardly to rotate pinions 14 and 12 and the corresponding cross shafts counterclockwise and clockwise, respectively, giving a power assist to the manual effort applied through the ball nut 74, which in the case of a right turn moves upwardly on the worm 72.

In the case of a left turn, the action is manifestly just the opposite of that described, the pressure differential across the piston 42 being in favor of the upper chamber 110.

Having thus described and illustrated our invention, what we claim is:

1. In a steering system including a pair of cross shafts extending at opposite sides of a casing through which said shafts are supported, a pair of mating pinions carried by said shafts within said casing, a steering shaft extending into said casing and means within said casing whereby the rotary movement of said steering shaft is translated into a rocking movement of said pinions and said cross shafts, the combination of power steering apparatus comprising a source of fluid pressure, a fluid motor operably connected to one of said cross shafts through the corresponding pinion, and a valve for controlling the fluid flow between said source and said motor, said valve being connected to said steering shaft for actuation on the turning thereof.

2. In a steering system including a pair of cross shafts extending at opposite sides of a casing through which said shafts are supported, a pair of mating pinions carried by said shafts within said casing, a steering shaft extending into said casing and supported therewithin by means permitting limited axial movement thereof, and means within said casing whereby the rotary movement of said steering shaft is translated into a rocking movement of said pinions and said cross shafts, the combination of power steering apparatus comprising a source of fluid pressure, a fluid motor operably connected to one of said cross shafts through the corresponding pinion, and a valve for controlling the fluid flow between said source and said motor, said valve having a part associated with said steering shaft and actuated by reactionary axial movement of said steering shaft.

3. In a steering system including a pair of cross shafts extending at opposite sides of a casing through which said shafts are supported, a pair of mating pinions carried by said shafts, a steering shaft extending into said casing and terminating therewithin in a worm, said steering shaft being supported by means permitting limited axial movement thereof, ball nut means carried by said worm and meshing through rack teeth with one of said pinions whereby the rotary movement of said steering shaft is translated into a rocking movement of said pinions and the said cross shafts, the combination of power steering apparatus comprising a source of fluid pressure, a fluid motor operably connected to one of said cross shafts through the corresponding pinion, and a valve for controlling the fluid flow between said source and said motor, said valve having a part associated with said steering shaft and actuated by reactionary axial movement of said steering shaft.

4. In a steering system including a pair of cross shafts extending at opposite sides of a casing through which said shafts are supported, a pair of mating pinions carried by said shafts within said casing, a steering shaft extending into said casing, and means within said casing whereby the rotary movement of said steering shaft is translated into a rocking movement of said pinions and said cross shafts, the combination of power steering apparatus comprising a source of fluid pressure, a fluid motor including a power cylinder formed as a part of said casing, a piston within said cylinder operably connected to one of said cross shafts through the corresponding pinion, and a valve actuated by a steering member for controlling the fluid flow between said source and said motor.

5. In a steering system including a pair of cross shafts extending at opposite sides of a casing through which said shafts are supported, a pair of mating pinions carried by said shafts within said casing, a steering shaft extending into said casing and terminating therewithin in a worm, said steering shaft being supported by means permitting limited axial movement thereof, ball nut means carried by said worm and meshing through rack teeth with one of said pinions whereby the rotary movement of said steering shaft is translated into a rocking movement of said pinions and said cross shafts, the combination of power steering apparatus comprising a source of fluid pressure, a fluid motor including a power cylinder formed as a part of said casing, a piston within said cylinder operably connected to one of said cross shafts through the corresponding pinion, and a valve for controlling the fluid flow between said source and said motor, said valve having a part associated with said steering shaft and actuated by reactionary axial movement of said steering shaft.

6. In a steering system including a pair of cross shafts extending at opposite sides of a casing through which said shafts are supported, a pair of mating pinions carried by said shafts within said casing, a steering shaft extending into said casing and terminating therewithin in a worm, said steering shaft being supported by means permitting limited axial movement thereof, ball nut means carried by said worm and meshing through rack teeth with one of said pinions whereby the rotary movement of said steering shaft is translated into a rocking movement of said pinions and said cross shafts, the combination of power steering apparatus comprising a source of fluid pressure, a fluid motor including a power cylinder formed as part of said casing and a piston within said cylinder having a shaft operably connected via rack means to one of said pinions, and a valve for controlling the fluid flow between said source and said motor, said valve having a part associated with said steering shaft and actuated by reactionary axial movement of said steering shaft.

References Cited in the file of this patent

UNITED STATES PATENTS 2,627,187    Davis _____ Feb. 3, 1953